United States Patent
Shimada

[11] 3,946,434
[45] Mar. 23, 1976

[54] COLOR TELEVISION CAMERA WITH LUMINANCE NON-UNIFORMITY COMPENSATION

[75] Inventor: Satoshi Shimada, Tokyo, Japan
[73] Assignee: Sony Corporation, Tokyo, Japan
[22] Filed: Nov. 2, 1973
[21] Appl. No.: 412,269

[30] Foreign Application Priority Data
Nov. 9, 1973 Japan.............................. 48-112305

[52] U.S. Cl............................. 358/44; 178/DIG. 25
[51] Int. Cl.²............................................. H04N 9/07
[58] Field of Search............ 358/43, 44, 37, 38, 55, 358/47, 32; 178/DIG. 25

[56] References Cited
UNITED STATES PATENTS

| | | | |
|---|---|---|---|
| 3,002,050 | 9/1961 | Richman................................ | 358/32 |
| 3,340,356 | 9/1967 | James.................................... | 358/37 |
| 3,549,901 | 12/1970 | Ross et al. ......................... | 358/37 X |
| 3,585,286 | 6/1971 | Macovski.............................. | 358/47 |
| 3,699,241 | 10/1972 | Larsen .................................. | 358/43 X |
| 3,715,473 | 2/1973 | Tan....................................... | 358/37 X |
| 3,719,771 | 3/1973 | Eto et al. ............................ | 358/55 X |
| 3,780,215 | 12/1973 | Shibata et al. ............... | 178/DIG. 25 |
| 3,798,353 | 3/1974 | Illetschko..................... | 178/DIG. 25 |

Primary Examiner—George H. Libman
Assistant Examiner—Mitchell Saffian
Attorney, Agent, or Firm—Lewis H. Eslinger; Alvin Sinderbrand

[57] ABSTRACT

A color television camera is provided with a single image pickup tube for producing a luminance signal and a chrominance signal, a demodulator for producing three primary color signals from the chrominance signal, an adder for adding the primary color signals to produce a relatively narrower band luminance signal and a subtraction circuit for subtracting the narrower band luminance signal from the luminance signal to produce a luminance signal compensated for non-uniformity, which is used for an aperture correction.

5 Claims, 21 Drawing Figures

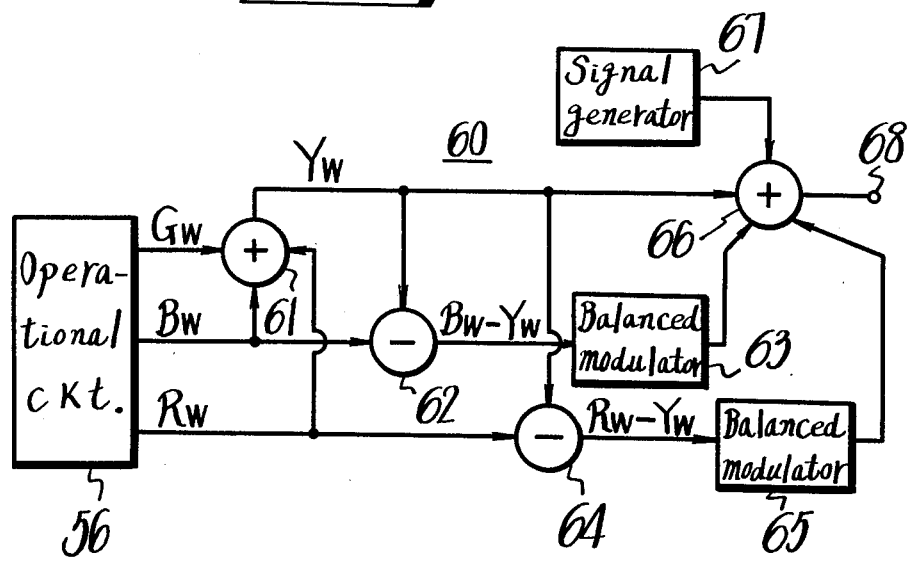
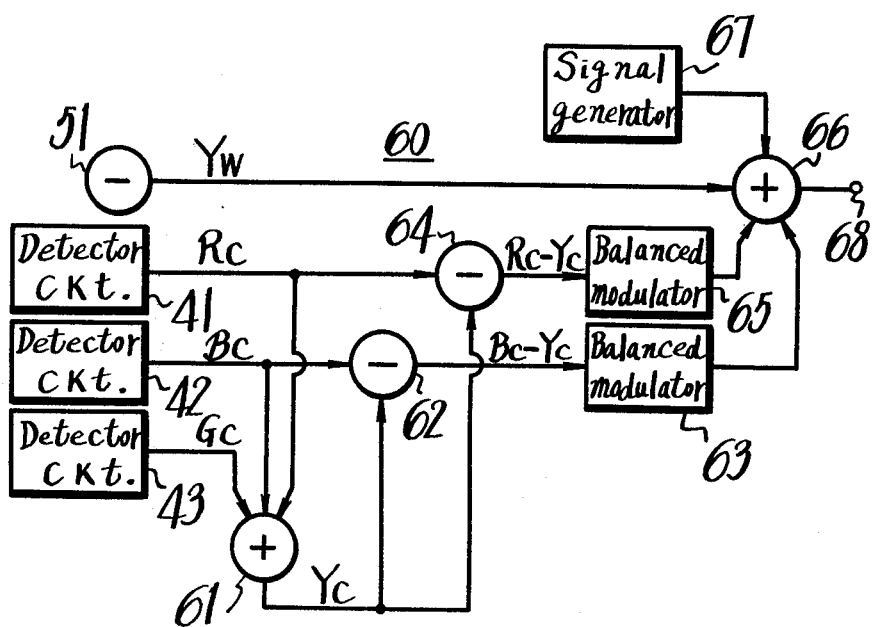

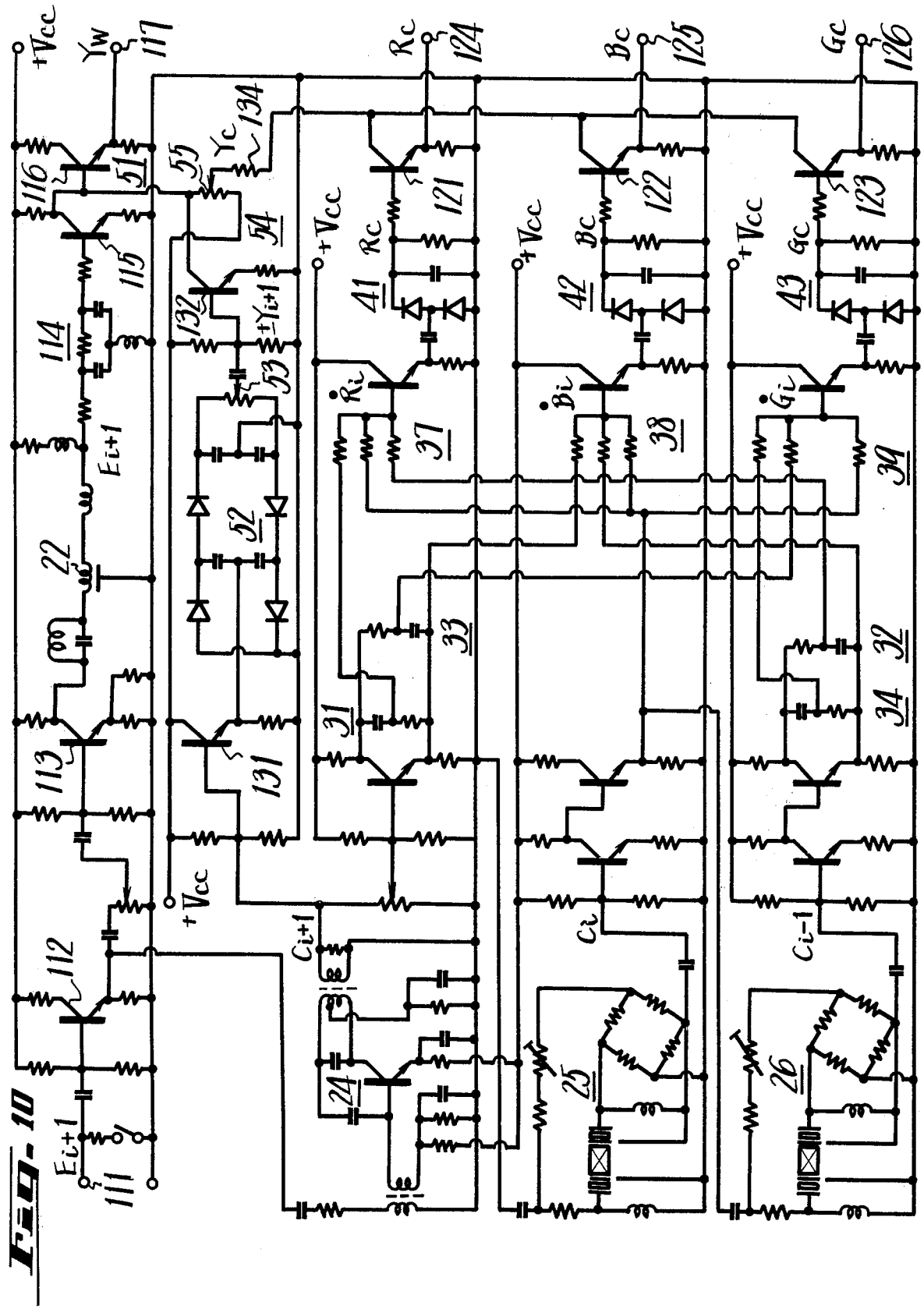

COLOR TELEVISION CAMERA WITH LUMINANCE NON-UNIFORMITY COMPENSATION

BACKGROUND OF THE INVENTION

1. Field of the Invention

This invention relates generally to a color television camera, and more particularly to a color television camera having a single image pickup device.

2. Description of the Prior Art

Various color television cameras which use a single image pickup tube have been proposed up to now. Since both chrominance and luminance signals are obtained from the single pickup tube in such color television cameras, the band of the luminance signal is limited. For this reason, the reproduced image based upon a video signal from the previously proposed television camera has less than the desired sharpness.

Further, prior art color television cameras have employed a color filter made up of a plurality of different color stripes so that, if a chrominance signal obtained therefrom is detected, a narrow band luminance signal is produced from the detected chrominance signal. Since the photoelectric conversion characteristics of the image pickup tube of such color television camera or the input-output characteristics of the transmission circuit are non-linear, such non-linear characteristics cause a detection operation and, consequently, the chrominance signal is detected to produce a narrow band luminance signal which is superimposed on the inherent or desired luminance signal. The level of the described narrow band luminance signal is varied in accordance with the level of the chrominance signal or with the brightness of an object to be televised, so that non-uniformity appears in the level of the luminance signal which is finally obtained from the color television camera and hence a bright and dark pattern is formed in a picture reproduced from the output signal of the camera.

SUMMARY OF THE INVENTION

It is an object of this invention to provide a color television camera which uses a single image pickup device for producing a luminance signal which is subjected to aperture correction.

It is another object of this invention to provide a color television camera which avoids non-uniformity in the level of the produced luminance signal by reason of non-linearity of the photo-electric conversion characteristics of an image pickup device used in the camera.

It is a further object of this invention to provide a color television camera which employs a single image pickup device with an improved color filter.

In accordance with an aspect of this invention, in a color television camera including an image pickup tube which produces a luminance signal and a chrominance signal in response to the projection onto the tube through a color filter of a color separated image of an object to be televised, a demodulator produces three primary color signals from the chrominance signal, and such color signals are added to produce a second luminance signal which, after adjustment of its level, is subtracted from the first mentioned luminance signal to provide a resulting luminance signal which is aperture corrected and thus produces a reproduced color image or picture of increased sharpness.

In accordance with another feature of this invention, in order to compensate for non-uniformity of the level of the luminance signal derived from the image pickup tube, for example, by reason of a non-linear photoelectric conversion characteristic of the latter, the chrominance signal from the image pickup tube is detected, and the detected chrominance signal, after adjustment of its level, is subtracted from the luminance signal.

The above, and other objects, features and advantages of this invention, will become apparent from the following detailed description of illustrative embodiments which is to be read in conjunction with the accompanying drawings.

BRIEF DESCRIPTION OF THE DRAWINGS

FIGS. 8 and 9 are systematic diagrams showing respective examples of encoders used for obtaining television signals according to the NTSC system;

FIGS. 10 and 11 are connection diagrams showing respective demodulator circuits that may be used in accordance with this invention;

DESCRIPTION OF THE PREFERRED EMBODIMENTS

Figure 1:
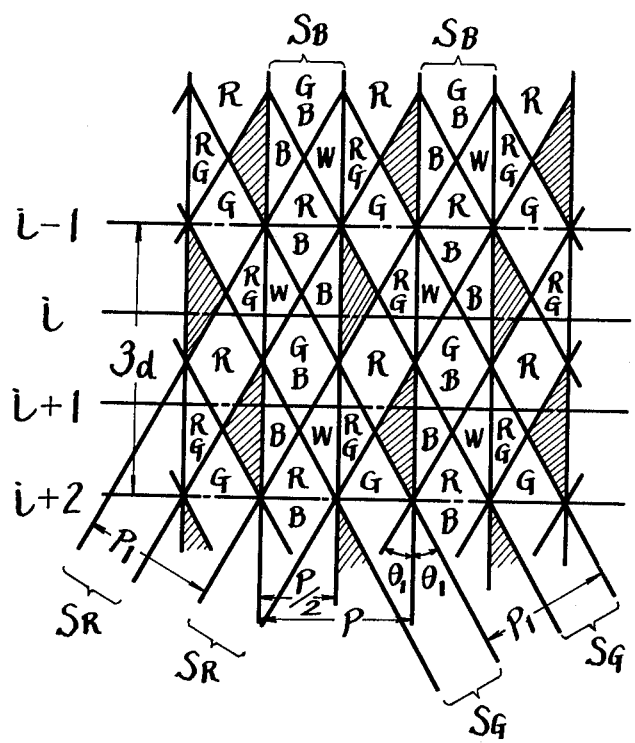
FIG. 1 is a schematic diagram showing an example of a color filter used in connection with this invention.

A first embodiment of this invention will now be described with reference ro FIGS. 1 to 7. As shown on FIG. 1, an example of an optical color filter used in accordance with this invention has stripe areas $S_R$, $S_B$ and $S_G$ through which red light, blue light and green light respectively pass. These stripe areas are arranged with the stripe areas $S_R$ and $S_G$ inclined in opposite directions by the angle $\theta_1$ with respect to the stripe areas $S_B$. The color filter is located in the light path in such a manner that when separated color images of an object to be televised are projected through the color filter onto the photoelectric conversion screen or plane of an image pickup device, the electron beam of such device will scan the separated color images in the direction at right angles to the stripe areas $S_B$, for example, along the lines indicated at $i-1$, $i$, $i+1$, $i+2$,... In this example, the pitches of the stripe areas $S_R$, $S_B$ and $S_G$, in the beam scanning direction, are equal to each other and their widths are equal to one-half of the pitch. Further, the areas identified by the reference characters W in FIG. 1 and which substantially permit passage of all light therethrough and the cross-hatched areas on FIG. 1 which substantially prevent passage of all light therethrough, are triangular in shape and arranged alternately in sequence in the beam scanning direction and not adjacent to each other.

The areas identified by characters R, B and G on FIG. 1 respectively permit the passage of red light, blue light and green light only, the areas identified by characters RB, RG and GB pass therethrough red and blue color lights (magenta), red and green color lights (yellow), and green and blue color lights (cyan), respectively.

The color filter shown on FIG. 1 may be produced by successively exposing a sheet of color film to red light through a mask having transparent stripe-like areas corresponding to the stripe areas $S_R$, to green light through a mask having transparent stripe-like areas corresponding to the stripe areas $S_G$, and to blue light through a mask having transparent stripe-like areas corresponding to the stripe areas $S_B$. Upon development of the thus exposed color film, the latter has the pattern of light transmitting characteristics described above with reference to FIG. 1.

Another practical method of producing the color filter of FIG. 1 involves superimposing a first filter element having clear transparent areas corresponding to stripe areas $S_R$ and cyan areas therebetween, a second filter element having clear transparent areas corresponding to the stripe areas $S_G$ and magenta areas therebetween, and a third filter element having clear transparent areas corresponding to the stripe areas $S_B$ and yellow areas therebetween. When such first, second and third filter elements are superimposed, the resulting composite color filter has the pattern of color transmitting characteristics described above with reference to FIG. 1.

In the color filter shown on FIG. 1, if the distance between the adjacent beam scanning lines is $d$, the pitch of the stripe areas $S_B$ is P and the pitch of the stripe areas $S_R$ and $S_G$ is $P_1$, the following relationships exist therebetween:

$$\tan \theta_1 = \frac{P}{3d}$$

$$P_1 = P \cos \theta_1$$

If the effective scanning area of the photoelectric conversion plane of the image pickup device is formed to have a vertical-to-horizontal aspect ratio of 3:4 (9mm × 12 mm) and 186 stripe images corresponding to the stripe areas $S_B$ are formed within the effective scanning area, the pitch P is selected to provide the color separated image projected onto the photoelectric conversion plane with a corresponding dimension of 12/186 or 64 microns. If the number of the effective scanning lines is 250, the distance $d$ is selected to provide a corresponding distance of 9/250 mm or 36 microns at the photoelectric conversion plane. Accordingly, the angle $\theta_1$ is selected to be about 30.6°.

If the aspect ratio of the effective scanning area is other than 3:4, for example, 1:2, by way of example, the angle $\theta_1$ is, of course, changed in accordance therewith.

In the case of interlaced scanning, projected color separated image is alternately scanned along the lines $i-1$, and $i$, $i$ and $i+1$,... shown on FIG. 1, and along lines therebetween during successive field periods.

When the pitch P is selected as mentioned above, the carrier frequency $f_c$ of the respective signal components becomes 3.58 MHz.

When the separated color images of the object to be televised obtained by means of the color filter of FIG. 1 are projected onto the photoelectric conversion plane of the image pickup device and scanned by the electron beam, and since the pitches of the respective stripe areas $S_R$, $S_B$ and $S_G$ are equal in the electron beam scanning direction, the chrominance signal components of red, blue and green are obtained as signals with the same carrier frequency. Further, since the respective stripe areas $S_R$, $S_B$ and $S_G$ are all inclined with respect to each other, the phase difference between the respective chrominance signal components is changed for adjacent horizontal lines. More specifically, a composite signal Ei derived from the color image pickup device during an arbitrary or ith horizontal scanning period can be expressed as follows:

$$\begin{aligned}E_i = &\ R_i[1 + \cos(\omega_c t + i\cdot\alpha + i\cdot\beta + \alpha_R)] \\&+ B_i[1 + \sin(\omega_c t + i\cdot\beta + \alpha_B)] \quad \text{Equation I} \\&+ G_i[1 + \cos(\omega_c t - i\cdot\alpha + i\cdot\beta + \alpha_G)]\end{aligned}$$

In the above equation I, Ri + Bi + Gi constitute a luminance signal, and may be represented merely as Yi. Further, if, in equation I, it is assumed $R_i \cos(\omega_c t + i\cdot\alpha + i\cdot\beta + \gamma_B) = \dot{R}_i$, $B_i \sin(\omega_c t + \cdots) = \dot{B}_i$ and $G_i \cos(\omega_c t + \cdots) = \dot{G}_i$, $\dot{R}_i + \dot{B}_i + \dot{G}_i$ constitute a chrominance signal which may be represented as Ci. In equation I, $\alpha$ and $\beta$ represent phase angles which are determined by the inclinations of the stripe areas, $\alpha_R$, $\alpha_B$ and $\alpha_G$ are initial phase angles and $\alpha = \frac{2}{3}\pi$ and $\beta = 0$ are satisfied in the case of the color filter shown on FIG. 1.

Figure 2:
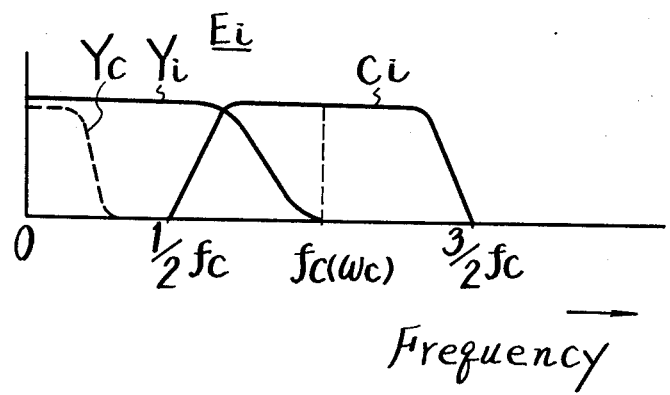
FIG. 2 is a graph illustrating the frequency spectra of signals obtained with the color filter depicted in FIG. 1.

The frequency spectra of the signal Ei are shown on FIG. 2.

Figure 3:
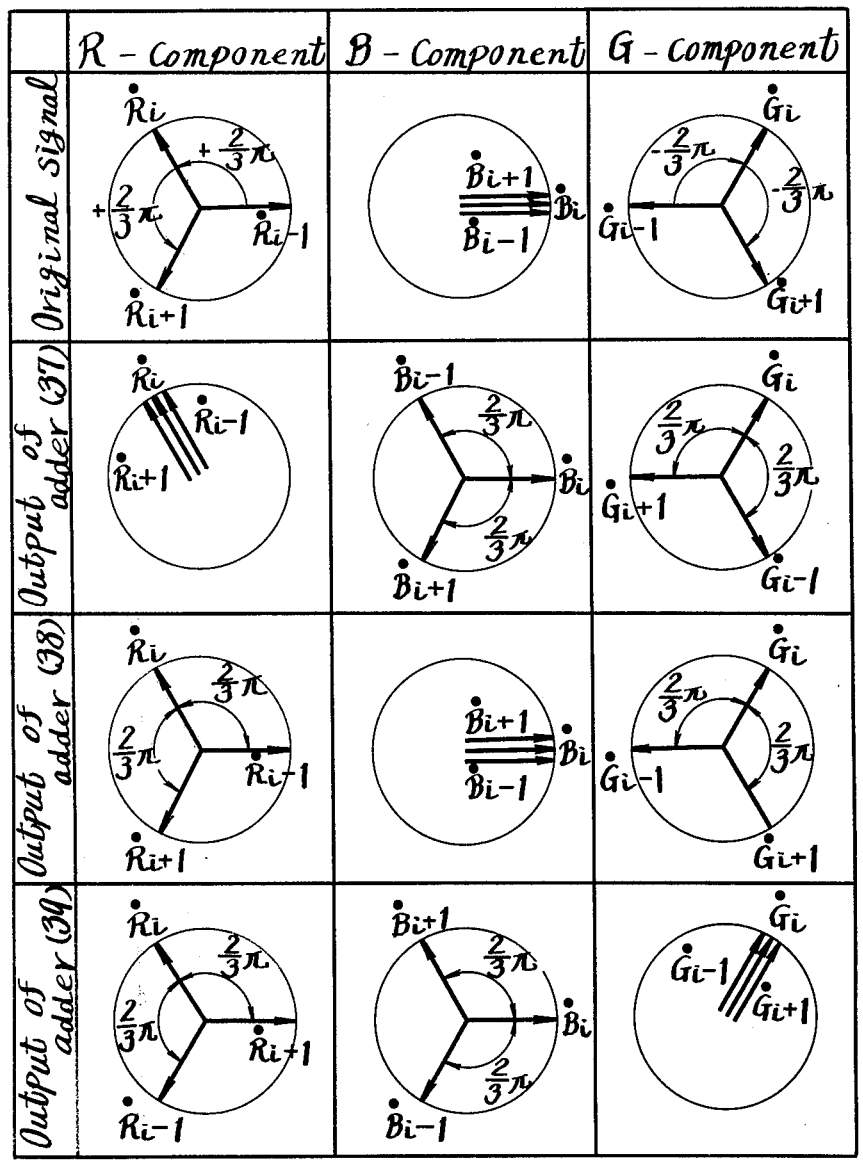
FIG. 3 shows vector diagrams to which reference will be made in explaining the present invention.

The phase relation of the several color components of the chrominance signal $C_i$ will now be described with reference to the vector diagrams shown on FIG. 3. As shown in the row at the top of FIG. 3, in the original signal from the image pickup tube the R component (red chrominance signal component) is advanced in phase by $\frac{2}{3}\pi$ during each horizontal interval in respect to the preceding horizontal interval, the B component (blue chrominance signal component) is unchanged in phase in adjacent horizontal intervals, and the G component (green chrominance signal component) is delayed in phase by $\frac{2}{3}\pi$ during each horizontal interval in respect to the preceding horizontal interval.

By reason of the foregoing, if the chrominance signals obtained during three successive horizontal intervals are subjected to suitable phase-shifting and operational processes, the red, blue and green chrominance components $\dot{R}_i$, $\dot{B}_i$ and $\dot{G}_i$ can be separated therefrom, as hereinafter described.

Figure 4:
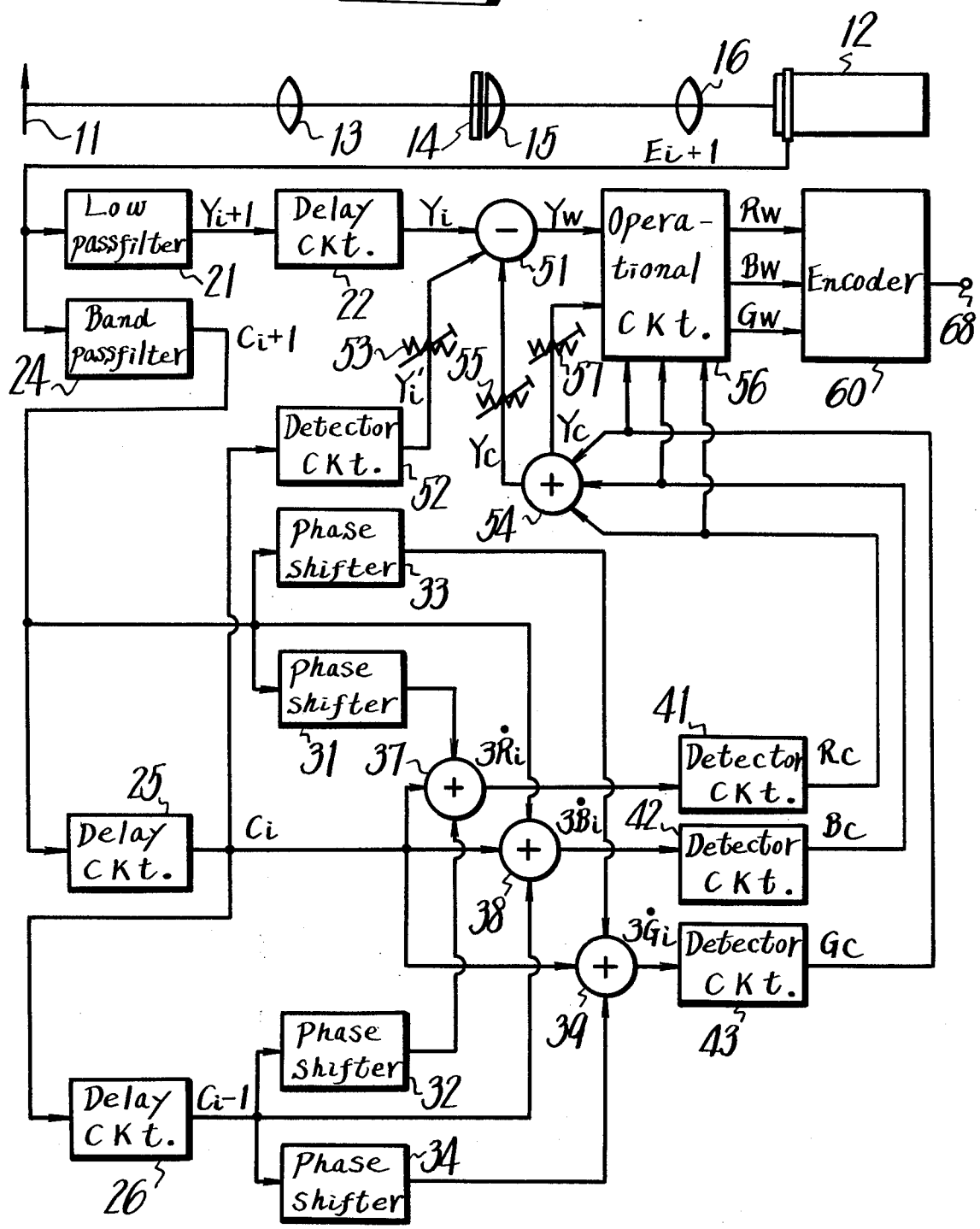
FIG. 4 is a systematic diagram of demodulator circuits in a first embodiment of this invention.

Referring now to FIG. 4, it will be seen that, in a color television camera according to an embodiment of this invention, as there illustrated, a main lens 13 is located in a light path between an object 11 to be televised and an image pickup tube 12. A color filter 14, which is substantially the same as that shown in FIG. 1, is positioned in the light path at the focusing plane of lens 13 to form separated color images of the object 11. The separated color images are projected through, for example, a field lens 15 and a relay lens 16 to the photoelectric conversion plane of the image pickup tube 12 and the above composite signal $E_{i+1}$ is obtained from tube 12 during the $(i+1)$th horizontal interval. In this case, the pitch between the stripe areas of the filter 14 is selected so that the carrier frequency $f_c$ is 5MHz.

The composite signal $E_{i+1}$ obtained from tube 12 is fed to a low pass filter 21 with a pass band of, for example, 0 to 4MHz to derive therefrom a luminance signal $Y_{i+1}$ which is applied to a delay line or circuit 22 to be delayed by the latter for one horizontal interval. Thus, a luminance signal Yi is derived from the delay circuit 22 during the $(i+1)$th horizontal interval. The composite signal $E_{i+1}$ from the image pickup tube 12 is further fed to a band-pass filter 24 with a pass band of, for example, 4 to 6MHz to pass therethrough a chrominance signal $C_{i+1}$ which is applied to delay lines or circuits 25 and 26 arranged in succession, and which each delay the signal applied thereto by one horizontal interval. Accordingly, a chrominance signal Ci is obtained from the delay circuit 25 during the $(i+1)$th horizontal interval and a chrominance signal $C_{i-1}$ is obtained from the delay circuit 26 during the same horizontal interval. Accordingly, the chrominance signals $C_{i+1}$, Ci and $C_{i-1}$ are derived from filter 24 and delay circuits 25 and 26, respectively, at the same time.

The chrominance signal $C_{i+1}$ from the filter 24 is applied to an adder 37 through a phase shifter 31 which delays the phase of a signal applied thereto by $\frac{2}{3}\pi$ and the chrominance signal Ci is directly applied to an adder 37. The chrominance signal $C_{i-1}$ is applied to the adder 37 through a phase shifter 32 which advances the phase of a signal applied thereto by $\frac{2}{3}\pi$. Accordingly, the color signal components in the chrominance signals $C_{i+1}$, Ci and $C_{i-1}$ as applied to the adder 37 have the phase relationships shown in the second row of FIG. 3. As there shown, the red color signal components $\dot{R}_{i+1}$, $\dot{R}i$ and $\dot{R}_{i-1}$ are the same in phase, the blue color signal components $\dot{B}_{i+1}$, $\dot{B}i$ and $\dot{B}_{i-1}$ have a phase difference of $\frac{2}{3}\pi$ between adjacent horizontal intervals, and the green color signal components $\dot{G}_{i+1}$, $\dot{G}i$ and $\dot{G}_{i-1}$ also have a phase difference of $\frac{2}{3}\pi$ between adjacent horizontal intervals. Accordingly, the blue color signal components and also the green color components cancel each other in the adder 37. As a result, the red color signal components $\dot{R}_{i+1}$, $\dot{R}i$ and $\dot{R}_{i-1}$ are added in the adder 37 and the output of the latter is the result of such addition. Since the signal components $\dot{R}_{i+1}$ and $\dot{R}_{i-1}$ are substantially equal to the signal component $\dot{R}i$, the added signal from the adder 37 is substantially 3 × $\dot{R}i$ or the red color signal component 3$\dot{R}i$ which is then applied to a detector circuit 41. The detector circuit 41 produces a red color signal $R_c$ by detecting the envelope of the signal 3$\dot{R}i$.

The chrominance signals $C_{i+1}$, Ci and $C_{i-1}$ from filter 24 and delay circuits 25 and 26, respectively, and also applied to an adder 38. In this case, as shown in the third row of FIG. 3, the red color signal components $\dot{R}_{i+1}$, $\dot{R}i$ and $\dot{R}_{i-1}$, as applied to adder 38, have a phase difference of $\frac{2}{3}\pi$ therebetween, the blue color signal components $\dot{B}_{i+1}$, $\dot{B}i$ and $\dot{B}_{i-1}$ are the same in phase, and the green color signal components $\dot{G}_{i+1}$, $\dot{G}i$ and $\dot{G}_{i-1}$ also have a phase difference of $\frac{2}{3}\pi$ therebetween. As a result, the adder 38 produces a blue color signal component 3$\dot{B}i$. The blue color signal component 3$\dot{B}i$ is fed to a detector circuit 42 which then produces a blue color signal $B_c$ by detecting the envelope of the signal 3$\dot{B}i$.

The chrominance signal $C_{i+1}$ from the filter 24 is supplied through a phase shifter 33 which shifts ahead or advances the phase of a signal applied thereto by $\frac{2}{3}\pi$ to an adder 39, which is also applied with the chrominance signal Ci from the delay circuit 25 as it is; and the chrominance signal $C_{i-1}$ from the delay circuit 26 is applied to adder 39 through a phase shifter 34 which has a phase delay characteristic of $\frac{2}{3}\pi$. In this case, as shown in the last row of FIG. 3, the red color signal components $\dot{R}_{i+1}$, $\dot{R}i$ and $\dot{R}_{i-1}$, as applied to adder 39, have a phase difference of $\frac{2}{3}\pi$ therebetween, the blue color signal components $\dot{B}_{i+1}$, $\dot{B}i$ and $\dot{B}_{i-1}$ also have a phase difference of $\frac{2}{3}\pi$ therebetween, and the green color signal components $\dot{G}_{i+1}$, $\dot{G}i$ and $\dot{G}_{i-1}$ are the same in phase, so that the adder 39 produces a green color signal component 3$\dot{G}i$ which is fed to a detector circuit 43. The detector circuit 43 produces a green color signal $G_c$ by detecting the envelope of the signal 3$\dot{G}i$.

The reason the delay time of delay circuit 22 is selected to correspond to one horizontal interval so as to provide the luminance signal Yi at the time of the line scan $i+1$ is to ensure that, although the three primary color signals $R_c$, $B_c$ and $G_c$ are obtained from the chrominance signals $C_{i+1}$, Ci and $C_{i-1}$, the three primary color signals $R_c$, $B_c$ and $G_c$ are matched in time. However, in a simplified embodiment of the invention, the delay circuit 22 may be omitted and its delaying function may be performed by the delay time of a color demodulator system which is, for example, selected to be about 0.7 to 0.8 micro-seconds.

The image pickup tube 12 may be considered to be a photoelectric conversion means having non-linear photoelectric conversion characteristics so that the luminance signal component derived therefrom has a nonuniform level for the reasons hereinafter described.

Figure 5:
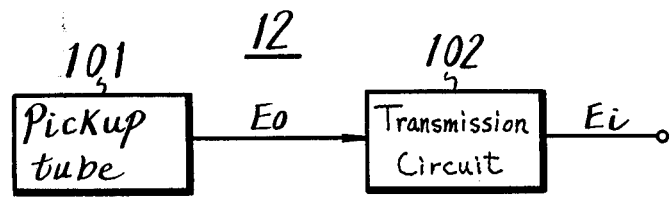
FIGS. 5 and 6 are diagrams to which reference will be made in explaining the effect of non-linear characteristics of an image pickup device.
Figure 6:
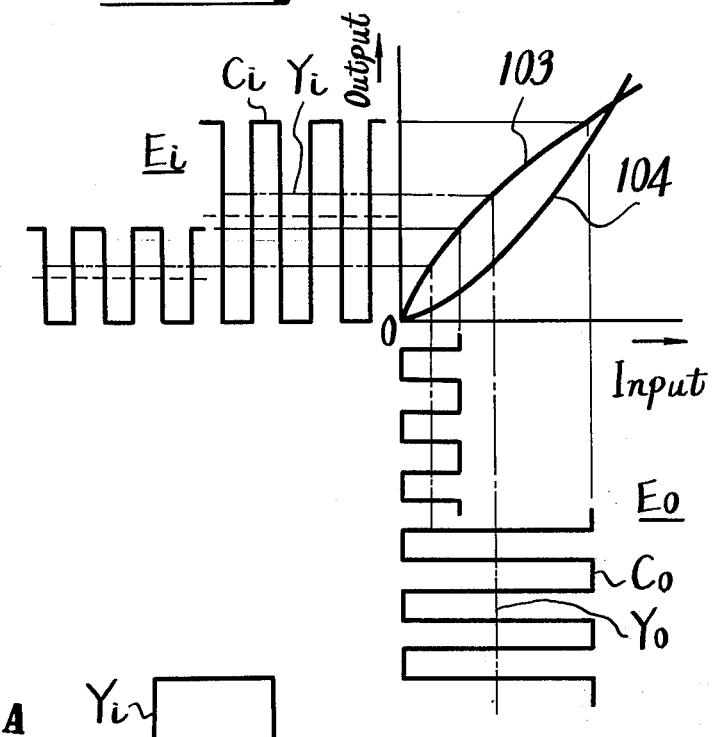
Figure 7A:
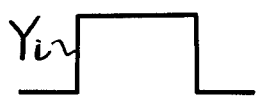
FIGS. 7A, 7B and 7C are waveform diagrams to which reference will be made in explaining how the sharpness of the reproduced picture is enhanced according to this invention.
Figure 7B:
Figure 7C:
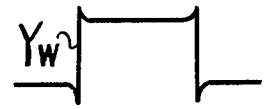

For the sake of simplicity, as shown on FIG. 5, it may be assumed that the image pickup tube 12 consists of an ideal image pickup tube 101 with a linear characteristic and a signal transmission circuit 102 with non-linear input-output characteristics and that the non-linear characteristics of the transmission circuit 102 are represented by the curve 103 in FIG. 6. With the foregoing assumptions, from the image pickup tube 101, there is obtained a composite signal $E_o$ consisting of a luminance signal $Y_o$ and a chrominance signal $C_o$ which are free from the non-linear characteristics and the composite signal $E_o$ is converted by the transmission circuit 102 to a composite signal Ei consisting of a luminance signal Yi and a chrominance signal Ci which are affected by the non-linear characteristics of transmission circuit 102.

When the chrominance signal $C_o$ passes through transmission circuit 102, it is subject to square-law detection due to the non-linear characteristic 103 of transmission circuit 102. Since the chrominance signal $C_o$ contains all the color information, its detected signal becomes a second luminance signal of narrow band which is mixed with the inherent luminance signal $Y_o$. Thus, a mixed signal is obtained as the luminance signal Yi.

If the width of the stripe areas forming the color filter 14 is selected to be one-half of their pitch, the level of the luminance signal $Y_o$ in the composite signal $E_o$ becomes one-half the peak-to-peak level of the chrominance signal $C_o$, as indicated by the dot-dash line on FIG. 6. However, by reason of the non-linear characteristics 103 and the resulting detection operation, the level of the luminance signal Yi in the composite signal Ei increases beyond one-half of the peak-to-peak level of the chrominance signal Ci, as shown on FIG. 6. This increased level of luminance signal Yi corresponds to the narrow band luminance signal component formed by detection of the chrominance signal $C_o$. As may be apparent from FIG. 6, such increase in the level of the resulting luminance signal becomes high as the level of the signal $E_o$ becomes high, or when the object 11 is bright, so that level non-uniformity occurs in the luminance signal Yi which appears as a pattern of non-uniform brightness in a reproduced picture.

When the non-linear characteristics of the transmission circuit 102 are represented by curve 104 on FIG. 6, the level of the luminance signal Yi in the composite signal Ei decreases below one-half of the peak-to-peak level of the chrominance signal Ci, and the decrease in the level of luminance signal Yi becomes relatively large when the brightness of the object is high, which also causes non-uniformity in the brightness of the reproduced picture.

The embodiment of the invention shown in FIG. 4 has a circuit which may compensate for the above described non-uniformity in the level of the luminance signal Yi. Such compensation circuit generally detects the level of the chrominance signal Ci and compensates for variations in the level of the luminance signal Yi by means of the detected output. More particularly, in the embodiment of FIG. 4, the luminance signal Yi from delay circuit 22 is applied to a subtracter 51 and the chrominance signal Ci, which corresponds to the luminance signal Yi, is applied from the delay circuit 25 to a detector circuit 52 to produce a detected output Yi' with positive polarity corresponding to, for example, the non-linear characteristics 103. In this case, the chrominance signal Ci is detected as it is, so that the detected output signal from circuit 52 is the narrow band luminance signal Yi' itself and its level is in proportion to the level of the chrominance signal Ci. The luminance signal Yi' has its level adjusted or is attenuated by an attenuator 53 to a predetermined level and the level adjusted signal is then applied to subtracter 51 to subtract the level adjusted luminance signal Yi' from the luminance signal Yi which is derived from the delay circuit 22. Since the level of the luminance signal Yi from the delay circuit 22 is decreased as the level of the chrominance signal Ci is increased, and since the level of the luminance signal Yi' from attenuator 53 is in proportion to that of the chrominance signal Ci, the subtracter 51 produces a compensated luminance signal the level of which does not change in response to changes in the level of the chrominance signal Ci.

In the arrangement shown on FIG. 4, when the delay time of the delay circuit 22 corresponds to that of the color demodulating system, it may be possible to apply the chrominance signal $C_{i+1}$ from the filter 24 to the detector circuit 52 instead of the chrominance signal Ci from the delay circuit 25.

Generally speaking, with a color television camera which employs a single image pickup tube, frequency bands for both the chrominance signal and the luminance signal are necessary, so that the band of the luminance signal is limited. Accordingly, a reproduced color image or picture based upon the video signal from such a color television camera is lacking in sharpness.

In order to improve the sharpness, in the embodiment of FIG. 4, there is provided a circuit which effects so-called preshooting and over-shooting in the luminance signal to carry out aperture correction and hence to improve the sharpness of the reproduced picture. More specifically, in the embodiment of FIG. 4, the three primary color signals $R_c$, $B_c$ and $G_c$ are applied to an adder 54 from detector circuits 41, 42 and 43, respectively, to provide a composite luminance signal $Y_c$. Since the band of the chrominance signal Ci is relatively narrow, that of the composite luminance signal $Y_c$ is relatively narrow, as shown on FIG. 2. If the luminance signal Yi is, for example, a rectangular wave as shown on FIG. 7A, the composite luminance signal $Y_c$ is a wave, such as shown on FIG. 7B, which rises and falls gradually. The composite luminance signal $Y_c$ from adder 54 is attenuated by an attenuator 55 to an adjusted predetermined level, for example, as represented by the dotted line on FIG. 7B and thereafter is applied to the subtractor 51 to subtract the level adjusted composite luminance signal $Y_c$ from the luminance signal Yi. Accordingly, the subtracter 51 produces a luminance signal $Y_w$ in which preshooting and over-shooting are achieved with aperture correction in the horizontal direction, as shown on FIG. 7C.

In this embodiment, since the composite luminance signal $Y_c$ is produced on the basis of the chrominance signals $C_{i+1}$, Ci and $C_{i-1}$ during three horizontal intervals, $i+1$, $i$ and $i-1$, aperture correction in the vertical direction, as well as that in the horizontal direction, is achieved in respect to the composite luminance signal $Y_c$.

In general, the resolution is highest at the center of the photoelectric conversion plane of the image pickup tube 12 and at the center of the optical system and is reduced close to their peripheries, so that the sharpness of the three primary color signals is deteriorated and color shading occurs at the periphery of the reproduced color picture.

In order to avoid such defects, in the embodiment of FIG. 4, there is provided a circuit which compensates the three primary color signals and is of the type disclosed in U.S. Pat. No. 3,548,087, issued to me on Dec. 15, 1970. More specifically, as shown, the three primary color signals $R_c$, $B_c$ and $G_c$ from detector circuits 41, 42 and 43, and the luminance signal $Y_w$ from subtracter 51 are applied to an operational circuit 56 which is further supplied with the composite luminance signal $Y_c$ from adder 54 after being attenuated or adjusted to a predetermined level by an attenuator 57. The operational circuit 56 carries out the following calculations:

$$R_c \times \frac{Y_w}{Y_c}, \quad B_c \times \frac{Y_w}{Y_c} \text{ and } G_c \times \frac{Y_w}{Y_c}$$

In this case, the signals $R_c$, $B_c$ and $Y_c$ have relatively narrow band widths but the signal $Y_w$ has a wide band as described above. If three primary color signals of wide band are indicated by $R_w$, $B_w$ and $G_w$ ($R_w + B_w + G_w = Y_w$), the following equations can be established:

$$R_w = k \cdot R_c$$
$$B_w = k \cdot B_c$$
$$G_w = K \cdot G_c$$

where $k$ represents a factor which varies in accordance with the out of focus condition of an image on the photoelectric conversion plate of the image pickup tube 12 within the condition $0 \leq k \leq 1$.

Accordingly, as a result of the above calculations by the operational circuit 56, the three primary color signals $R_c$, $B_c$ and $G_c$ are made constant in level regardless of the value of factor $k$, that is, they are made into three primary color signals $R_w$, $B_w$ and $G_w$ which have high resolution regardless of the degree of out of focus of the image. Further, due to the fact that the signals $R_c$, $B_c$ and $G_c$ are made constant in level, color shading is also prevented. The thus obtained three primary color signals $R_w$, $B_w$ and $G_w$ with high resolution and wide band width are applied to, for example, an NTSC system encoder 60.

An example of an NTSC system encoder 60 is shown on FIG. 8, in which the three primary color signals $R_w$, $B_w$ and $G_w$ from operational circuit 56 are applied to an adder 61 to be added therein and thus provide a luminance signal $Y_w$ of wide band. The luminance signal $Y_w$ and the blue color signal $B_w$ from the operational circuit 56 are both applied to a subtracter 62 to produce a blue color difference signal $B_w-Y_w$ which is applied to a balanced modulator 63 producing a balanced modulated signal with the blue color difference signal. The signal $Y_w$ from the adder 61 and the red color signal $R_w$ from the operational circuit 56 are applied to a subtracter 64 to produce a red color difference signal $R_w-Y_w$ which is fed to a balanced modulator 65 producing a balanced modulated signal with the red color difference signal. The balanced modulated signal with the red color difference signal is shifted in phase by $\frac{1}{2}\pi$ from the balanced modulated signal with the blue color difference signal. The balanced modulated signals with blue and red color difference signals from the balanced modulators 63 and 65 respectively, are applied to an adder 66 to produce a quadrature balanced modulated signal with the red and blue color difference signals. The adder 66 is further supplied with the luminance signal $Y_w$ from the adder 61, and with suitable vertical and horizontal synchronizing signals and burst signals from a signal generator 67. Thus, the adder 66 produces a color video signal according to the NTSC system and delivers the same to an output terminal 68.

In the event that the operational circuit 56 is not provided, the encoder 60 may be formed as shown on FIG. 9 in which the same reference numerals are employed to identify elements which correspond to those included in the encoder of FIG. 8. It will be seen that, in the encoder of FIG. 9, the three primary color signals $R_c$, $B_c$ and $G_c$ from the detector circuits 41, 42 and 43 are applied to the adder 61 to produce the composite luminance signal $Y_c$. The subtracters 62 and 64 produce the blue and red color difference signals $B_c-Y_c$ and $R_c-Y_c$, respectively, from the luminance signal $Y_c$ and the signals $B_c$ and $R_c$. The wide band luminance signal $Y_w$ from the subtracter 51 is fed to the adder 66 which is also supplied with the outputs from the balanced modulators 63 and 65 and from the signal generator 67. Thus, the adder 66 produces and delivers a color video signal according to the NTSC system to the output terminal 68.

Referring now to FIG. 10 which shows a practical connection diagram for the color demodulator system described above with reference to FIG. 4, it will be seen that, in FIG. 10, the several components of such system are identified by the same reference numerals as on FIG. 4. In the connection diagram of FIG. 10, the composite signal $E_{i+1}$ derived from the image pickup tube 12 is fed through an imput terminal 111, a transistor 112 and a transistor 113 to the delay circuit 22 to be delayed by the delay time of the color demodulator system (or one horizontal interval) and thereafter to a trap circuit 114 which produces the luminance signal Yi by removing the chrominance signal Ci. The luminance signal Yi is applied through a transistor 115 to a transistor 116 included in the subtracter 51. Thus, the wide band luminance signal $Y_w$ can be obtained at a terminal 117 which is connected with the emitter electrode of transistor 116.

The composite signal $E_{i+1}$ passed through the transistor 112 is applied to the band-pass filter 24 to separate the chrominance signal $C_{i+1}$ which is treated in the manner described above. Thus, three primary color signals $R_c$, $B_c$ and $G_c$ are obtained from detector circuits 41, 42 and 43 and are delivered through transistors 121, 122 and 123 to terminals 124, 125 and 126 which are connected with the emitter electrodes of the transistors 121, 122 and 123, respectively.

The chrominance signal $C_{i+1}$ from band-pass filter 24 is further applied to the detector circuit 52 through a transistor 131. In this case, the detector circuit 52 is formed so that it produces detected output signals or luminance signals $Y'_{i+1}$ and $-Y'_{i+1}$ of positive and negative polarities. The attenuator or variable resistor 53 connected to the output side of detector 52 delivers therethrough the luminance signal with a positive or negative polarity and an adjusted predetermined level in accordance with the non-linear characteristics 103 or 104 referred to above with reference to FIG. 6, and the level adjusted luminance signal is supplied to the subtracter 51 through a transistor 132. Thus, the luminance signal from detector 52 is added to or subtracted from the luminance signal $Y_{i+1}$ from the transistor 115 to compensate for the non-uniformity in the level of the luminance signal $Y_{i+1}$.

The collector electrodes of transistors 121, 122 and 123 are connected with a common load resistor 134 to form the adder 54 from which the composite luminance signal $Y_c$ is obtained. The composite luminance signal $Y_c$ is applied through the attenuator or variable resistor 55, which is connected to the collector electrode of transistor 132, to transistor 116 of subtracter 51 to carry out the aperture correction of the luminance signal $Y_{i+1}$ from the transistor 115.

Figure 11:
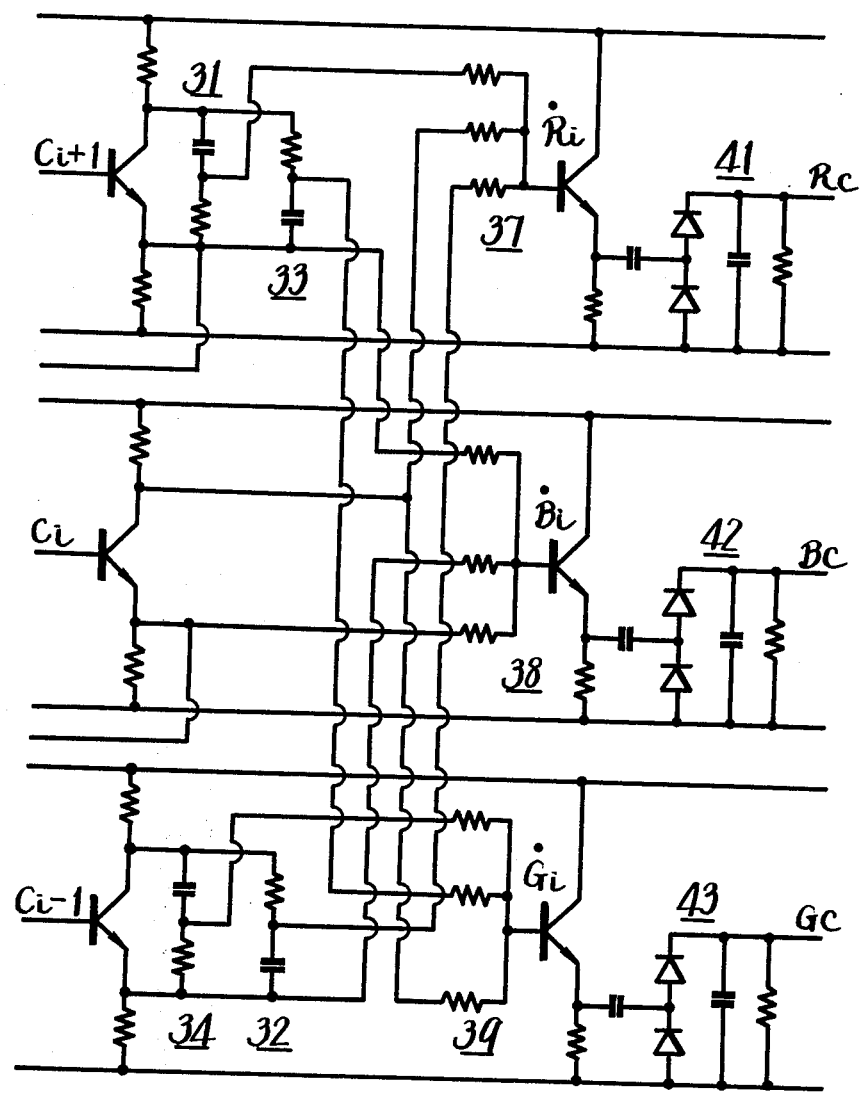

If desired, the phase-shift effected by phase shifters 32 and 33 may be selected to be $\frac{1}{3}\pi$, and, in that case the adders 37, 38 and 39 are connected as shown in FIG. 11.

Another embodiment of this invention will now be described with reference to FIGS. 12 to 15 in which the color filter 14 is formed with a different pattern from that described above and the various elements are identified by the same reference numerals used in connection with the corresponding elements in the previously described embodiment.

Figure 12:
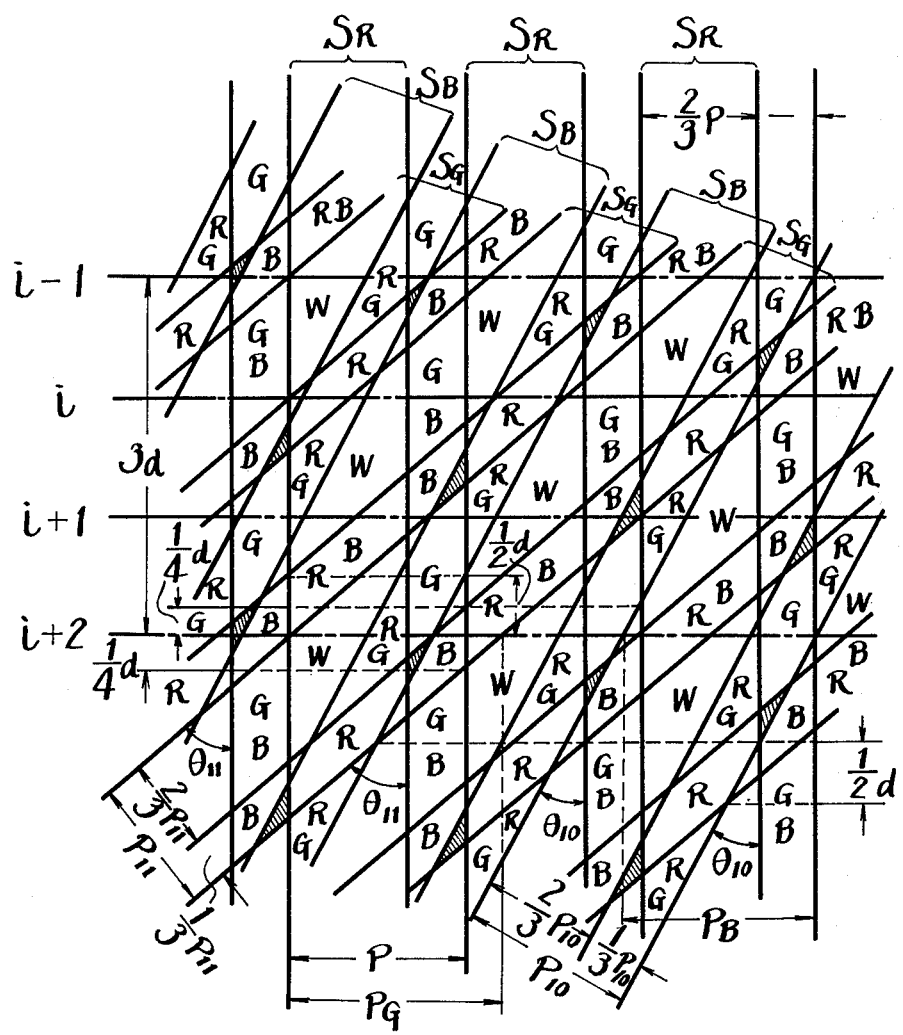
FIG. 12 is a diagram showing another color filter according to this invention.
Figure 13:
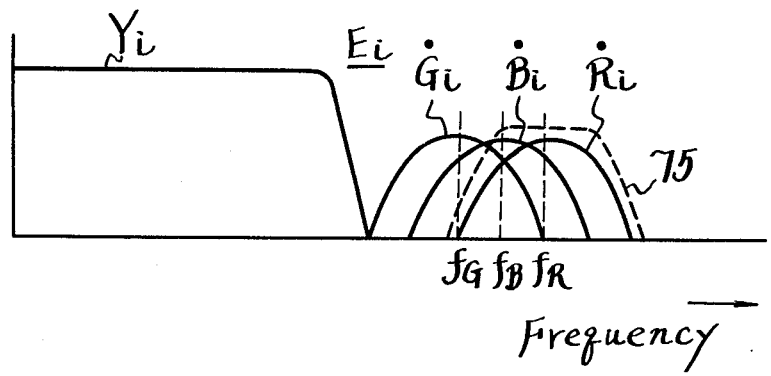
FIG. 13 is a graph showing the frequency spectra of signals obtained with the color filter of FIG. 12.

In the color filter 14 of FIG. 12, the stripe areas $S_R$, $S_B$ and $S_G$ are arranged so that the red, blue and green color components $\dot{R}i$, $\dot{B}i$ and $\dot{G}i$ of the chrominance signal have carrier frequencies $f_R$, $f_B$ and $f_G$ which are slightly different from each other as shown on FIG. 13. More specifically, the red color signal component $\dot{R}i$ has the highest carrier frequency $f_R$ and the green color signal component $\dot{G}_i$ has the lowest carrier frequency.

In the color filter 14 shown on FIG. 12, the stripe areas $S_B$ are inclined by the angle $\theta_{10}$ with respect to the stripe areas $S_R$, and the stripe areas $S_G$ are inclined by the angle $\theta_{11}$, which is greater than the angle $\theta_{10}$, with respect to the stripe areas $S_R$ in the same direction as the stripe areas $S_B$. The pitches P, $P_B$ and $P_G$ of the stripe areas $S_R$, $S_B$ and $S_G$, in the beam scanning direction, are also slightly different from each other. The widths of the stripe areas $S_R$, $S_B$ and $S_G$ in the beam scanning direction are ⅔P, ⅔$P_B$ and ⅔$P_G$, respectively. Accordingly, the areas W which permit passage of all light therethrough and the cross-latched areas which inhibit the passage of all light therethrough, that is, the areas where three stripe areas $S_R$, $S_B$ and $S_G$ are superposed, lie on lines that are inclined in respect to the beam scanning direction.

If it is assumed that the distance between two adjacent beam scanning lines is $d$ and the pitches of the stripe areas $S_B$ and $S_G$ are $P_{10}$ and $P_{11}$, the following equations are derived:

$$\tan \theta_{10} = \frac{P}{(3 - \frac{1}{4})d} = \frac{4P}{11d}$$

$$\tan \theta_{11} = \frac{2P}{(3 - \frac{1}{2})d} = \frac{4P}{5d}$$

$$P_B = P + \frac{1}{4}d \tan \theta_{10}$$

$$P_G = P + \frac{1}{4}d \tan \theta_{11}$$

$$P_{10} = P_B \cos \theta$$

$$P_{11} = P_G \cos \theta_{11}$$

When separated color images of the object 11 produced by the color filter 14 shown on FIG. 12 are projected onto the photoelectric conversion plane of the color image pickup tube 12 and are scanned by the electron beam, the fact that the pitches of the stripe areas $S_R$, $S_B$ and $S_G$ in the beam scanning direction are different from each other, the phase difference between the chrominance signal components is different for two adjacent horizontal scanning intervals.

In the case where the pitch P and the distance d are selected as described above, by way of example, the carrier frequencies $f_R$, $f_B$ and $f_G$ of the respective chrominance signal components become 3.58MHz, 3.3MHz and 3.0MHz.

Thus, the composite signal $E_i$ derived from the image pickup tube during the ith horizontal scanning interval can be expressed as follows:

$$\begin{aligned} E_i = &\tfrac{2}{3}R_i + \tfrac{1}{3}R_i\cos(\omega_R t + i\cdot\alpha_R + \beta_R) \\ &+ \tfrac{2}{3}B_i + \tfrac{1}{3}B_i\cos(\omega_B t + i\cdot\alpha_B + \beta_B) \\ &+ \tfrac{2}{3}G_i + \tfrac{1}{3}G_i\cos(\omega_G t + i\cdot\alpha_G + \beta_G) \end{aligned}$$ Equation II where $\alpha_R = 0$, $\alpha_B = +\tfrac{2}{3}\pi$ and $\alpha_G = +\tfrac{3}{4}\pi$.

Figure 14:
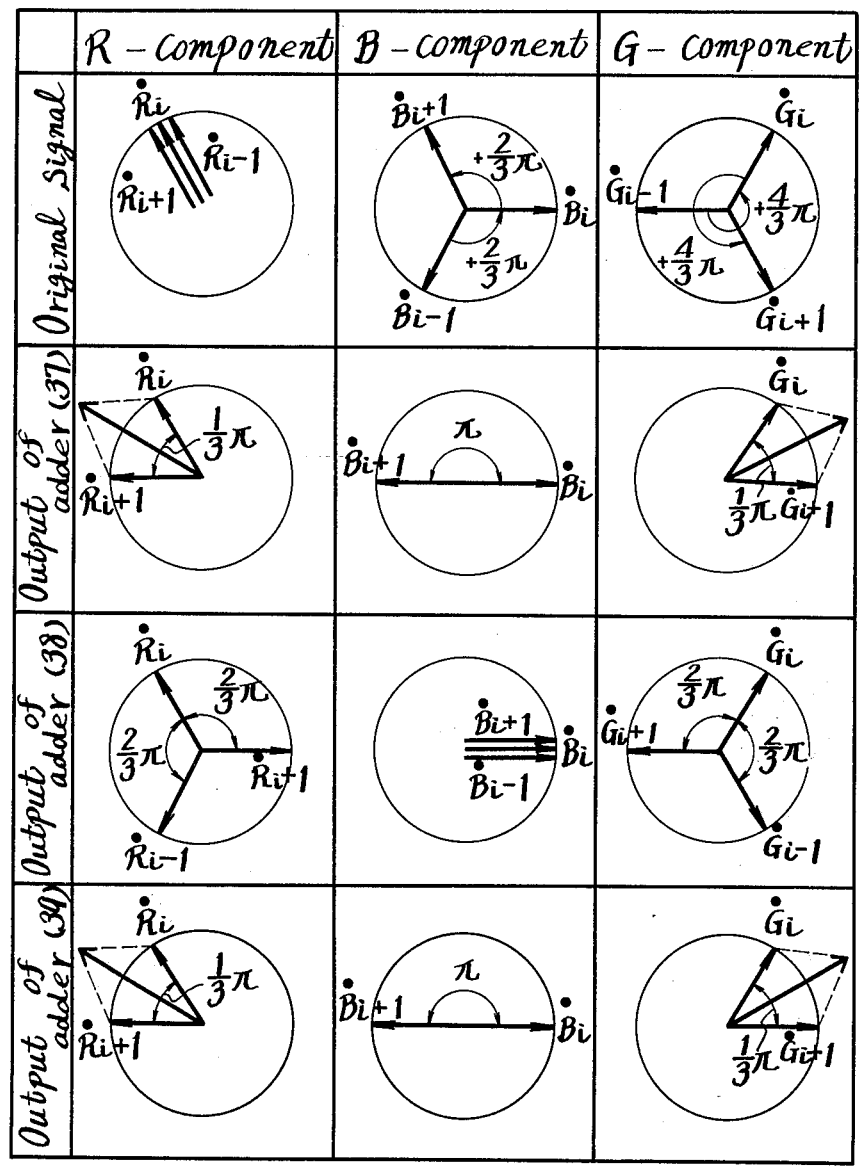
FIG. 14 shows vector diagrams to which reference will be made in explaining the operation of another embodiment of this invention.

As shown in the first or top row of FIG. 14, the phase of the red chrominance signal component does not change in the adjacent horizontal intervals, the phase of the blue chrominance signal component is advanced by ⅔π during each horizontal interval in respect to its phase in the preceding interval, and the phase of the green chrominance signal component is advanced by $4/3 \pi$ during each horizontal interval in respect to its phase in the preceding interval.

Figure 15:
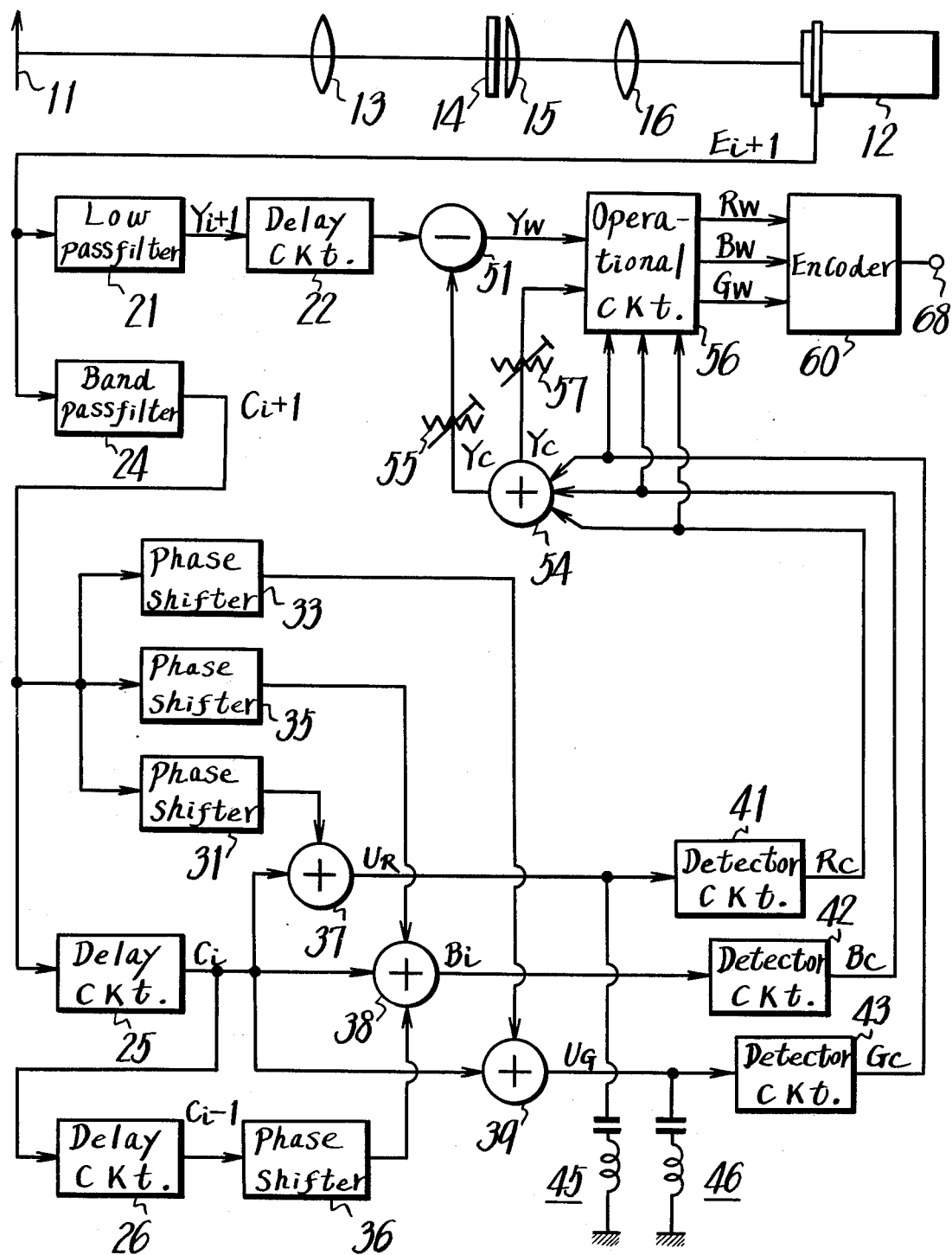
FIG. 15 is a systematic diagram showing a further example of a demodulator circuit according to this invention.

With the circuit arrangement shown on FIG. 15 and employing the color filter of FIG. 12, the chrominance signals $C_{i+1}$, $C_i$ and $C_{i-1}$ are simultaneously obtained from the filter 24 and the delay circuits 25 and 26. The chrominance signal $C_{i+1}$ from filter 24 is applied through the phase shifter 31, which advances the phase of a signal applied thereto by ⅓π, to the adder 37, and the chrominance signal $C_i$ from delay circuit 25 is directly applied to the adder 37. Since the color signal components in the chrominance signals $C_{i+1}$, $C_i$ and $C_{i-1}$ have the phase relationships shown in the first row of FIG. 14, in the adder 37 the phase difference of ⅓π exists between the red color signal components $\dot{R}_{i+1}$ and $\dot{R}_i$, the blue color signal components $\dot{B}_{i+1}$ and $\dot{B}_i$ are reversed in phase, and the phase difference of ⅓π exists between the green color signal components $\dot{G}_{i+1}$ and $\dot{G}_i$, as shown in the second row on FIG. 14. Accordingly, an added output of $U_R = \sqrt{3}(\dot{R}_i + \dot{G}_i)$ is derived from the adder 37. Such signal $U_R$ is applied to a trap circuit 45 where the green color signal component $\sqrt{3}\dot{G}_i$ is eliminated, and the remaining red color signal component $\sqrt{3}\dot{R}_i$ is fed to the detector circuit 41 to produce a red color signal $R_c$.

The chrominance signal $C_{i+1}$ is fed to the adder 38 through a phase shifter 35, which performs a phase delay of ⅔π and the chrominance signal $C_i$ is fed directly to the adder 38 from the delay circuit 25. The chrominance signal $C_{i-1}$ is fed to the adder 38 through a phase shifter 36 which advances the phase by ⅔π. Since the phase difference of ⅔π exists between the red color signal components $\dot{R}_{i+1}$, $\dot{R}_i$ and $\dot{R}_{i-1}$ in the adder 38, the blue color signal components $\dot{B}_{i+1}$, $\dot{B}_i$ and $\dot{B}_{i-1}$ have the same phase in the adder 38, and the phase difference of ⅔π exists between the green color signal components $\dot{G}_{i+1}$, $\dot{G}_i$ and $\dot{G}_{i-1}$ in the adder 38, as shown in the third row of FIG. 14, the blue color signal component $3\dot{B}_i$ is derived from the adder 38. Such signal component $3\dot{B}_i$ is fed to the detector circuit 42 to produce the blue color signal $B_c$.

The adder 39 is supplied with the chrominance signal $C_{i+1}$ through the phase shifter 33 which performs the phase advance of ⅓π and with the chrominance signal $C_i$ directly from delay circuit 25, and hence produces the added output $U_G = U_R = \sqrt{3}(\dot{R}_i + \dot{G}_i)$, as shown in the last row of FIG. 14. The signal $U_G$ is fed to a trap circuit 46 which eliminates the red color signal $\sqrt{3}\dot{R}_i$, and the remaining green color signal component $\sqrt{3}\dot{G}_i$ is applied to the detector circuit 43 to produce the green color signal $G_c$. Since the remainder of the circuit arrangement shown in FIG. 15 is substantially the same as that described above with reference to FIG. 4, its detailed description is omitted for the sake of brevity.

The stripe areas $S_R$, $S_B$ and $S_G$ of the color filter 14 shown on FIG. 12 and used with the circuit arrangement of FIG. 15, are given widths that are greater than one-half of the respective pitches, and hence the transparent areas W which transmit light of all colors are relatively wide, so that the levels of the chrominance signal components $\dot{R}_i$, $\dot{B}_i$ and $\dot{G}_i$ are lower than the level of the luminance signal $Y_i$, as shown on FIG. 13. As a result of the foregoing, the narrow band luminance signal produced in response to detection of the chrominance signal by reason of the non-linearity of the photoelectric conversion characteristics of the image pickup tube or the non-linear input-output characteristic of the signal transmission path, has a low level. Accordingly, in the color television camera employing a color filter which ensures that the level of the chrominance signal is always lower than that of the luminance signal, the detector circuit 52 and the attenuator 53 of FIG. 4 can be omitted, as in the circuit arrangement of FIG. 15.

A further embodiment of this invention will now be described with reference to FIGS. 16 to 19 in which the several elements are identified by the same reference numerals used in the foregoing embodiments to identify the corresponding elements.

Figure 16:
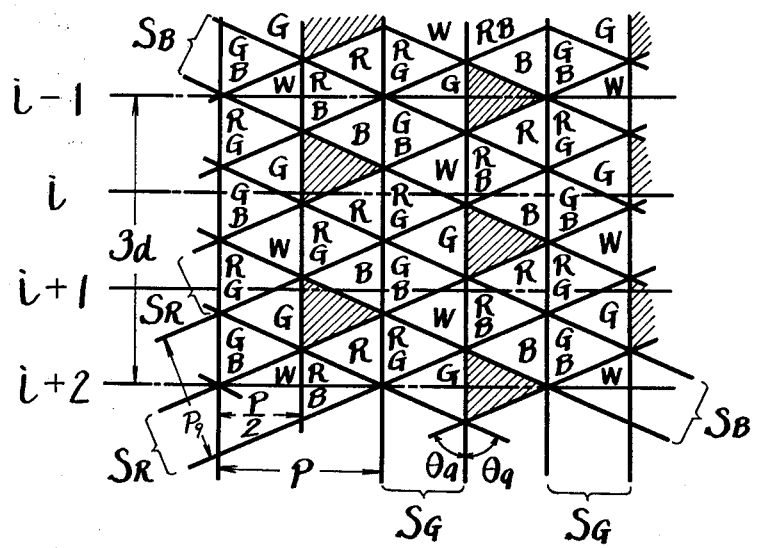
FIG. 16 is a diagram showing still another example of a color filter according to this invention.
Figure 17:
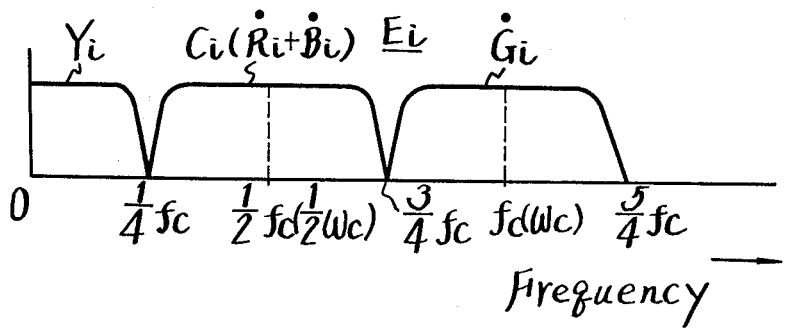
FIG. 17 is a graph showing the frequency spectra of signals obtained with the color filter of FIG. 16.

FIG. 16 shows the pattern of the color filter 14 used in this embodiment, and there are obtained red and blue chrominance signal components $\dot{R}i$ and $\dot{B}i$ having the same carrier frequency, and a green chrominance signal component $\dot{G}i$ that is two times the carrier frequency of components $\dot{R}i$ and $\dot{B}i$, as shown on FIG. 17. The two chrominance signal components $\dot{R}i$ and $\dot{B}i$ with the same carrier frequency have different phase shifts between adjacent horizontal intervals, and the phase difference between the adjacent horizontal intervals for each of these two chrominance signal components is selected to be different from $\pi$ and whole or integral multiples thereof.

In the color filter of FIG. 16, the stripe areas $S_R$ and $S_B$ are inclined in different directions with respect to the stripe areas $S_G$ by the same angle $\theta_9$. In this case, the following relationships are established:

$$\tan \theta_9 = \frac{4P}{3d}$$
$$P_9 = 2P\cos\theta_9$$

where P represents the pitch of the stripe areas $S_G$ in the beam scanning direction and $P_9$ is the pitch of the stripe areas $S_R$ and $S_B$.

If the pitch P is selected as in the above case, the carrier frequency $f_c$ of the green chrominance signal component becomes 3.58MHz and the carrier frequency of the red and blue chrominance signal components becomes 1.79MHz. Since the inclination directions of the stripe areas $S_R$ and $S_B$ are different from each other, the phase shifts of the red and blue chrominance signal components between two adjacent horizontal intervals are different. Further, as may be apparent from FIG. 16, the phase shifts of the stripe areas $S_R$ and $S_B$ between adjacent beam scanning lines are (4/3) P, in the beam scanning direction, that is to say, do not coincide with the pitch 2P of the stripe areas $S_R$ and $S_B$ in the beam scanning direction or with one-half of such pitch or any whole multiple thereof. Therefore, the phase difference of the red and blue chrominance signal components between the adjacent horizontal intervals becomes different from $\pi$ and from whole or integral multiples thereof.

Thus, the chrominance signal components become rectangular wave signals containing only odd numbered high frequency components and the second high frequency components of the red and blue chrominance signal components are not mixed into the green chrominance signal component. Thus, the composite signal Ei derived from the image pickup tube during an arbitrary (ith) horizontal scanning interval can be expressed as follows:

$$\text{Ei} = \text{Ri}[1+\cos(\tfrac{1}{2}\omega_c t+i\cdot 4/3\pi+\beta_R)]$$
$$+ \text{Bi}[1+\cos(\tfrac{1}{2}\omega_c t-i\cdot 4/3\pi+\beta_B)] \quad \text{Equation III}$$
$$+\text{Gi}[1+\sin(\omega_c t+\beta_G)]$$

Figure 18:
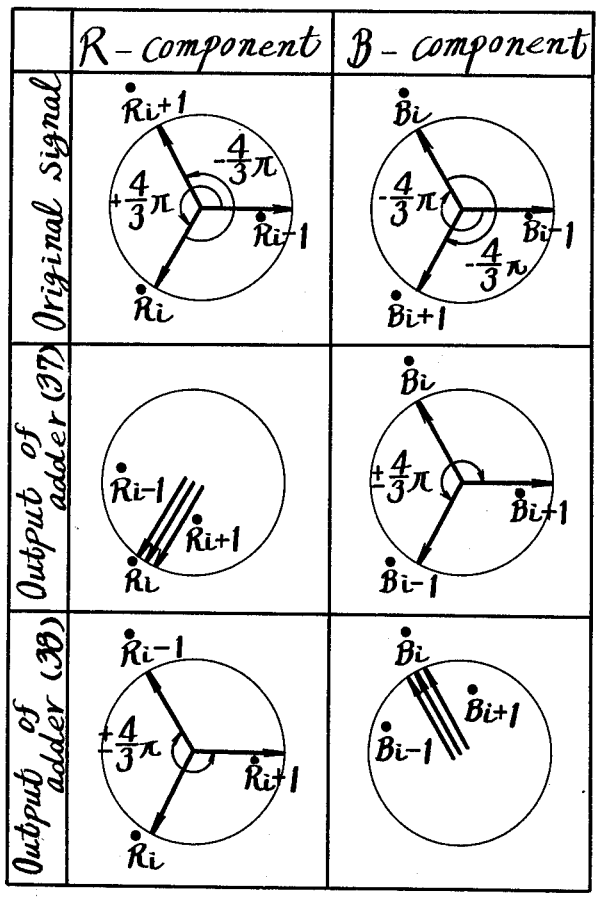
FIG. 18 shows vector diagrams to which reference will be made in explaining the operation of a further embodiment of this invention.

The red chrominance signal component in a certain horizontal interval is advanced in phase by $4/3\pi$ in respect to that in the following horizontal interval, but the blue chrominance signal component in a certain horizontal interval is delayed in phase by $4/3\pi$ in respect to that in the following horizontal interval, as shown in the top row of FIG. 18.

Accordingly, the green chrominance signal component $\dot{G}i$ can be separated from the red and blue chrominance signal components $\dot{R}i$ and $\dot{B}i$ on the basis of its different frequency, and the remaining red and blue chrominance signal components $\dot{R}i$ and $\dot{B}i$ can be separated from each other by delaying the signals and by suitably carrying out the phase shifting and calculating operations by reeason of the phase differences during the successive horizontal intervals.

Figure 19:
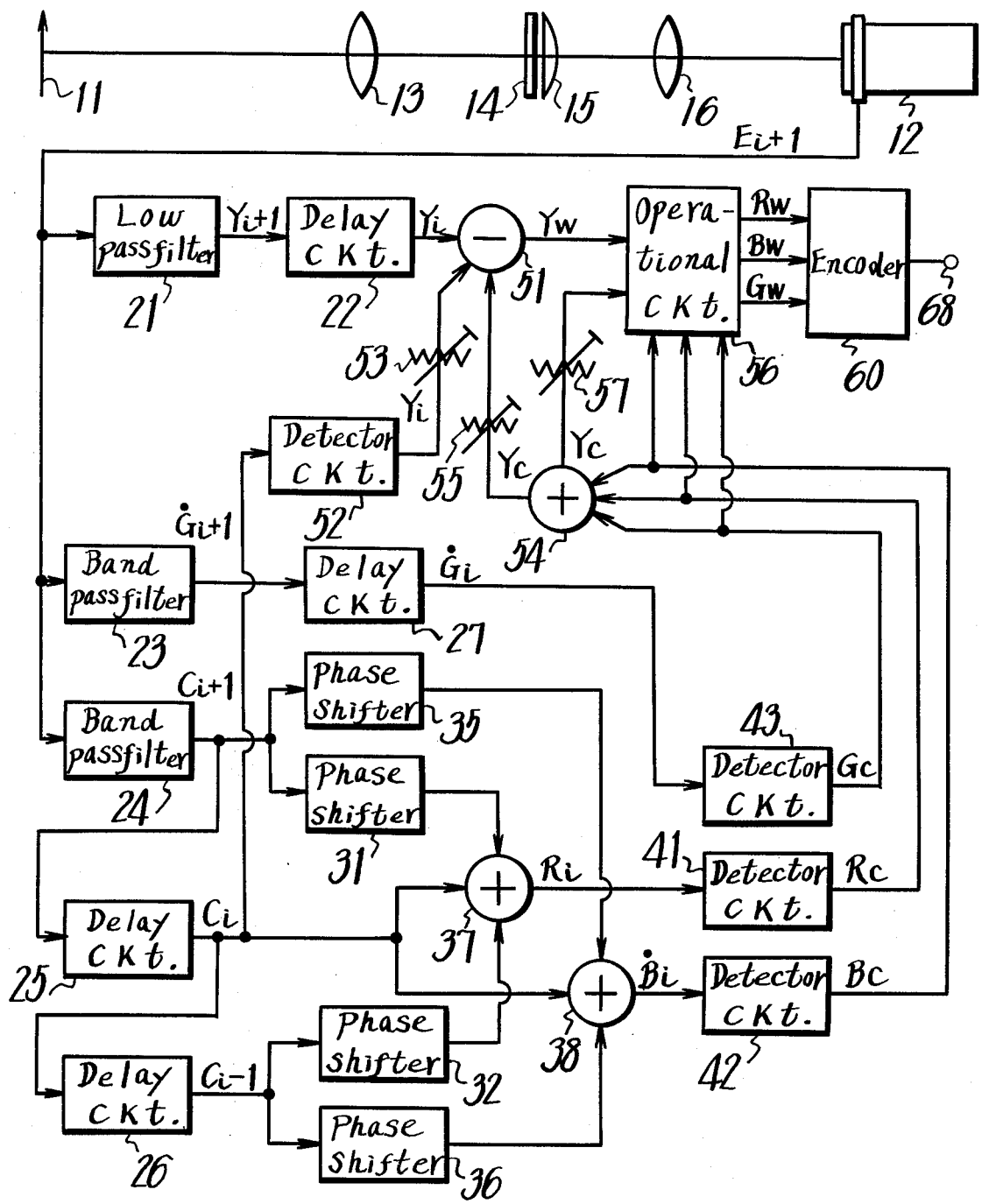
FIG. 19 is a schematic diagram showing yet another example of a demodulator circuit according to this invention.

Referring now to FIG. 19, it will be seen that, in the circuit arrangement there shown for use with the color filter of FIG. 16, the composite signal $E_{i+1}$ from the image pickup tube 12 is fed to the low pass filter 21 to derive the luminance signal $Y_{i+1}$ therefrom, which is then applied to the delay circuit 22 to produce the luminance signal Yi during the (i+1)th horizontal interval by delaying it one horizontal interval. The composite signal $E_{i+1}$ is further fed to a band pass filter 23 to derive therefrom the green chrominance signal component $\dot{G}_{i+1}$ which is then applied to a delay circuit 27 having a delay time of one horizontal interval to produce the green chrominance signal component $\dot{G}i$ during the (i+1)th horizontal interval. The signal component $\dot{G}i$ is fed to the detector circuit 43 which then produces the green color signal $G_c$ by envelope-detection of the green chrominance signal component.

The composite signal $E_{i+1}$ from the image pickup tube 12 is further applied to the band pass filter 24 to derive therefrom the red and blue chrominance signal components which are hereinafter referred to, together, as the partial chrominance signal $C_{i+1}$. Such partial chrominance signal is fed to the delay circuits 25 and 26 which are arranged successively and each delay the signal by one horizontal interval, in order to produce the partial chrominance signal Ci from the delay circuit 25 and the partial chrominance signal $C_{i-1}$ from the delay circuit 26 during the (i+1)th horizontal interval. Thus, the partial chrominance signals $C_{i+1}$, Ci and $C_{i-1}$ are simultaneously obtained from filter 24 and delay circuits 25 and 26, respectively.

The partial chrominance signal $C_{i+1}$ is fed to the adder 37 through the phase shifter 31 for delaying the signal by $4/3\pi$, the partial chrominance signal Ci is fed directly from delay circuit 25 to the adder 37, and the partial chrominance signal $C_{i-1}$ is fed to adder 37 through the phase shifter 32 for advancing the signal by $4/3\pi$. Thus, the phase relationships between the red and blue signal components of the partial chrominance signals $C_{i+1}$, Ci and $C_{i-1}$ fed to the adder 37 are as shown in the second row of FIG. 18. That is, the red color signal components $\dot{R}_{i+1}$, $\dot{R}i$ and $\dot{R}_{i-1}$ have the same phase, but a phase difference of $4/3\pi$ exists between the blue color signal components $\dot{B}_{i+1}$ and $\dot{B}i$ and between the components $\dot{B}i$ and $\dot{B}_{i-1}$. Accordingly, in the adder 37 the blue color signal components cancel each other, so that the adder 37 produces the added signal of the red color signal components $\dot{R}_{i+1}$, $\dot{R}i$ and $\dot{R}_{i-1}$ (each of which is equivalent to the signal component Ri, so that the red color signal component derived from adder 37 will be hereinbelow referred to as Ri).

The signal Ri thus obtained is fed to the detector circuit 41 which produces the red color signal $R_c$ by envelope-detection.

The partial chrominance signal $C_{i+1}$ from filter 24 is also fed to the adder 38 through the phase shifter 35 for advancing the signal by $4/3\pi$, and the partial chrominance signal Ci from delay circuit 25 is fed directly to the adder 38. Further, the partial chrominance signal $C_{i+1}$ from delay circuit 26 is fed to the adder 38 through the phase shifter 36 for delaying the signal by $4/3\pi$. In this case, as is shown in the last row of FIG. 18, a phase difference of $2/3\pi$ exists between the red color signal components $\dot{R}_{i+1}$ and $\dot{R}_i$ and between the components $\dot{R}_i$ and $\dot{R}_{i-1}$ so that the red color signal components cancel each other in adder 38, and the blue chrominance signal components $\dot{B}_{i+1}$, $\dot{B}_i$ and $\dot{B}_{i-1}$ have the same phase, so that the blue chrominance signal component $\dot{B}_i$ is obtained from the adder 38. The blue chrominance signal component $\dot{B}_i$ is fed to the detector circuit 42 which then produce the blue color signal $B_c$ by envelope-detection.

In the embodiment of FIG. 19, in order to compensate for nonuniformity in the level of the luminance signal, the partial chrominance signal Ci from the delay circuit 25 corresponding to the luminance signal Yi is fed to the detector circuit 52 to produce, for example, a detected output of positive polarity in response to the non-linear characteristic 103 on FIG. 6, and hence to compensate for nonuniformity of the level of luminance signal Yi in a similar manner to that described above.

In the above described embodiments, the color filter 14 has been shown to be provided apart from the image pickup tube 12, but the color filter 14 may be made an integral part of the image pickup tube 12 with the same results.

Further, in the described embodiments, each color filter 14 has been associated with a television camera. However, it is also possible to project the separated color images obtained through the color filter 14 onto a monochrome film which is then subjected to developing, fixing and printing treatments, and thereafter the information recorded on the film is picked up by the image pickup tube 12 to produce the desired color signals.

Further, the present invention can be applied to the case where the composite signal Ei is recorded on a photographic film by means of electron beam printing techniques, whereupon the photographic film with the record thereon, or a reprint of such film, is scanned for reproduction of the recorded signal.

Although illustrative embodiments of the invention have been described in detail herein with reference to the accompanying drawings it is to be understood that the invention is not limited to those precise embodiments, and that various changes and modifications may be effected therein by one skilled in the art without departing from the scope or spirit of the invention as defined in the appended claims.

What is claimed is:

1. A color television camera for producing a composite video signal including chrominance and luminance signals, the latter having non-uniform characteristics, comprising an image pickup means, a color filter interposed optically between an object to be televised and said image pickup means for separating an image of said object into respective color components which are projected onto said image pickup means, means for deriving the luminance signal and the chrominance signal from said image pickup means, and means for substantially eliminating said non-uniform characteristics from the luminance signal, the last-mentioned means comprising means for detecting said chrominance signal to produce a luminance signal component in response thereto, means for adjusting the level of said produced luminance signal component, and means for subtracting the level adjusted luminance signal component from said luminance signal to thereby compensate said non-uniform characteristics.

2. A color television camera in accordance with claim 1 wherein said color filter is comprised of at least two differently colored stripe areas forming different angles with the beam scanning line of an electron beam which scans said image pickup means in successive scan lines.

3. A color television camera in accordance with claim 1 wherein said color filter is comprised of three differently colored stripe areas disposed in repetitive patterns; each of said stripe areas forming a different angle with the beam scanning line of an electron beam which scans said image pickup means in successive scan lines.

4. A color television camera in accordance with claim 3 wherein said means for detecting comprises detecting means for detecting the chrominance signal during a scan line to produce said luminance signal component as derived from said scan line; and wherein said means for subtracting comprises subtracting means for subtracting the level adjusted luminance signal component as derived from said scan line from the luminance signal which is produced during said scan line.

5. Color television camera apparatus comprising an image pickup means, a color filter interposed optically between an object to be televised and said image pickup means for separating an image of said object into respective color components which are projected onto said image pickup means, means for scanning said projected image in successive horizontal scanning intervals for deriving a composite signal comprised of a luminance signal and a chrominance signal for each horizontal scanning interval, means for receiving said composite signal and for separating same into a luminance signal and a chrominance signal for each horizontal scanning interval, delay means coupled to said separating means for producing the chrominance signal derived during the immediately preceding horizontal scanning interval and the chrominance signal derived during the second immediately preceding horizontal scanning interval, means coupled to said separating means for producing the luminance signal derived during said immediately preceding horizontal scanning interval, demodulator means coupled to said separating means and said delay means to receive the chrominance signal derived during the present horizontal scanning interval, the chrominance signal derived during the immediately preceding horizontal scanning interval and the chrominance signal derived during the second preceeding horizontal scanning interval for producing three primary color signals from said received chrominance signals, detecting means coupled to said delay means for detecting the chrominance signal derived during said immediately preceding horizontal scanning interval to produce a luminance signal component in response thereto, subtracting means for receiving the luminance signal derived during said immediately preceding horizontal scanning interval and to subtract therefrom said produced luminance signal component, and combining means coupled to said subtracting means and said demodulator means for producing a color video signal.

* * * * *